US 6,395,425 B1

(12) United States Patent
Kanno et al.

(10) Patent No.: US 6,395,425 B1
(45) Date of Patent: May 28, 2002

(54) NON-AQUEOUS ELECTROLYTE SECONDARY BATTERY WITH A LITHIUM COPPER TITANIUM OXIDE ELECTRODE

(75) Inventors: Yoshimi Kanno; Shunji Watanabe; Hideharu Onodera; Shinichi Takasugi; Tsugio Sakai, all of Chiba (JP)

(73) Assignee: Seiko Instruments Inc. (JP)

( * ) Notice: Subject to any disclaimer, the term of this patent is extended or adjusted under 35 U.S.C. 154(b) by 53 days.

(21) Appl. No.: 09/644,480

(22) Filed: Aug. 23, 2000

(30) Foreign Application Priority Data

Sep. 7, 1999 (JP) .............................. 11-252769

(51) Int. Cl.[7] .......................... H01M 4/02; H01M 4/40; H01M 4/48
(52) U.S. Cl. .................. 429/220; 429/231.5; 429/231.1
(58) Field of Search .............................. 429/220, 231.5, 429/231.1

(56) References Cited

U.S. PATENT DOCUMENTS

| 5,284,721 A | * | 2/1994 | Beard ........................... 429/194 |
| 6,221,531 B1 | * | 4/2001 | Vaughey ................... 429/231.1 |
| 6,274,271 B1 | * | 8/2001 | Koshiba ................... 429/231.1 |

FOREIGN PATENT DOCUMENTS

| JP | 01226729 | * | 9/1989 | ............ H01M/4/02 |
| JP | 2001126728 | * | 5/2001 | ............ H01M/4/02 |

* cited by examiner

Primary Examiner—Gabrielle Brouillette
Assistant Examiner—Mark Ruthkosky
(74) Attorney, Agent, or Firm—Adams & Wilks

(57) ABSTRACT

Provided is a non-aqueous electrolyte secondary battery capable of ensuring good characteristics even in case of low-voltage charge at 2.5 V or so. A composite oxide of a compositional formula, $Li_aCu_bTi_cO_4$ (with $0<a\leq1$, $0<b\leq0.5$, $1.5\leq c<2$) serving as a positive or negative electrode active material is mixed with an electroconductive agent and a binder, and shaped under pressure into electrodes for the battery.

2 Claims, 4 Drawing Sheets

NON-AQUEOUS ELECTROLYTE SECONDARY BATTERY WITH A LITHIUM COPPER TITANIUM OXIDE ELECTRODE

BACKGROUND OF THE INVENTION

The present invention relates to a non-aqueous electrolyte secondary battery, in which is used lithium or a substance capable of absorbing and desorbing lithium for the active material for the positive or negative electrode and which contains a lithium ion-conductive non-aqueous electrolyte, in particular, to improvements in the charge-discharge latitude in the battery.

Recent developments in a variety of portable electronic appliances and communication appliances are remarkable, and many of such appliances require high-power batteries. In that situation, there is a great demand for secondary batteries with increased energy density for economic, downsized and lightweight appliances. For these, non-aqueous electrolyte secondary batteries with increased energy density have been being studied and developed, and some of them are now in practical use.

In ordinary secondary batteries of that type, $LiCoO_2$, $LiMnO_2$, $Li_4Mn_5O_{12}$ or the like is used for the positive electrode active material, and lithium metal or a substance capable of absorbing and desorbing lithium, such as $LiTi_2O_4$, $Li_4Ti_5O_{12}$ or the like, is for the negative electrode active material. Secondary batteries comprising a combination of these have the advantage of large charge-discharge capacity, but must be charged at high voltage of around 3 V or so in order that they could fully ensure their capacity.

Portable electronic appliances and communication appliances capable of being driven even at low voltage are desired these days, for which, therefore, desired are secondary batteries capable of fully ensuring their capabilities even when charged at low voltage of around 2.5 V or so.

SUMMARY OF THE INVENTION

In order to meet the recent charge requirements as above that differ from the conventional ones in the art, the present invention is to provide a positive or negative electrode active material capable of ensuring good charge-discharge characteristics even at voltage differing from that for conventional secondary batteries.

Using a composite oxide of a compositional formula, $Li_aCu_bTi_cO_4$ (in which $0<a\leq 1$, $0<b\leq 0.5$, $1.5\leq c<2$) for the positive or negative electrode herein, the invention has made it possible to fabricate a non-aqueous electrolyte secondary battery capable of being charged at voltage differing from that for conventional batteries.

DETAILED DESCRIPTION OF THE PREFERRED EMBODIMENTS

Figure 1:
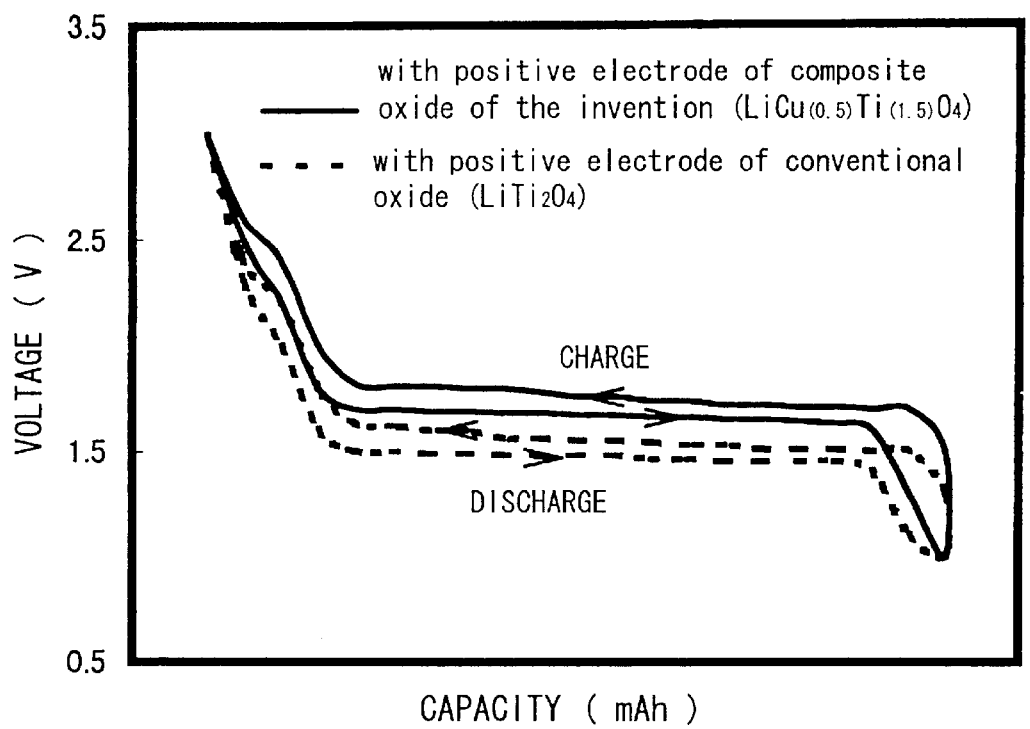
FIG. 1 is a charge-discharge voltage curve of a lithium secondary battery, in which the positive electrode is made of the composite oxide of the invention or a conventional oxide, $LiTi_2O_4$, and the negative electrode is made of a lithium metal.

Up to the present, no one knows that the composite oxide of a compositional formula, $Li_aCu_bTi_cO_4$ (with $0<a\leq 1$, $0<b\leq 0.5$, $1.5\leq c<2$), which is used for the positive or negative electrode active material in the invention, could be used for an active material for lithium secondary batteries. $Li_aCu_bTi_cO_4$ is a spinel-structured cubic-system crystal, into or from which lithium is intercalated or released in charge-discharge cycles. The voltage at which batteries are charged to have satisfactory battery capabilities shall vary, depending on the positive or negative electrode active material in the batteries.

Based on the reference spinel crystal having a compositional formula, $LiTi_2O_4$, the crystal of $Li_aCu_bTi_cO_4$ is discussed. In the crystal of $Li_aCu_bTi_cO_4$, Cu ions that differ from Ti ions in the ion radius and the ion valency will form a solid solution in the site B, thereby inducing crystal distortion therein. As a result, it is believed that Li will be intercalated into and released from the crystal of $Li_aCu_bTi_cO_4$ at voltage differing from that at which Li shall be into or from the reference spinel crystal. of $LiTi_2O_4$.

In the compositional formula $Li_aCu_bTi_cO_4$, a is specifically defined to be $0<a\leq 1$. This is because, in the spinel structure of the crystal, Li is in the site A, and if a in the formula oversteps the defined range, the crystal could not have a single spinel phase. In the formula, b and c are also defined to be $0<b\leq 0.5$ and $1.5\leq c<2$, respectively. This is because, in the spinel structure of the crystal, Cu and Ti are both in the site B, but if b indicating the proportion of Cu is larger than 0.5, the crystal structure will be unstable. If the spinel crystal of $Li_aCu_bTi_cO_4$ having such an unstable crystal structure is used in fabricating lithium batteries, the cycle characteristics of the batteries are poor. For ensuring better cycle characteristics of lithium batteries that comprise the composite oxide $Li_aCu_bTi_cO_4$, it is desirable that b+c=2 in order that the site B in the crystal is entirely filled with Cu and Ti atoms only.

$Li_aCu_bTi_cO_4$ may be prepared in any known manner. To prepare it, for example, titanium oxide ($TiO_2$) is mixed with an Li-containing compound and a Cu-containing compound, such as their oxides, hydroxides, carbonates, acetates or the like, in a predetermined ratio, and baked under heat at a temperature not lower than 600° C., preferably between 700 and 900° C., in air or in an oxygen-containing atmosphere, preferably in an oxygen atmosphere. In case where oxygen-containing compounds are used to prepare the composite oxide, they may be heated in an inert atmosphere. The heating time may fall generally between 4 and 50 hours. However, in order to promote the reaction to produce the composite oxide and to increase the uniformity of the composite oxide produced, the process that comprises baking the starting compounds, cooling the baked product and grinding it is repeated a few times.

To form an electrode comprising the active material of $Li_aCu_bTi_cO_4$, the composite oxide is mixed with an electroconductive agent and a binder and the resulting mixture is shaped under pressure. Preferably, the electroconductive agent is electrochemically stable and has high conductivity. For example, preferred is graphite or acetylene black. It is also desirable that the binder is electrochemically stable. For example, preferred is a fluororesin, a polyacrylic resin or the like.

The electrode substance for the counter electrode in the battery of the invention is not specifically defined, but is preferably any of lithium metal, $LiCoO_2$, $LiNiO_2$, $LiMn_2O_4$, $Li_xNi_yCo_{1-y}O_2$, $Li_xCo_yB_{1-y}O_2$, etc.

The electrolyte to be in the battery is a lithium ion-conductive, non-aqueous organic electrolyte, including, for example, a non-aqueous (organic) electrolytic solution prepared by dissolving a supporting electrolyte of a lithium ion-dissociating salt, such as $LiClO_4$, $LiBF_6$, $LiBF_4$, $LiCF_3SO_3$, $Li(CF_3O_2)_2N$ or the like, in a single or mixed solvent of organic compounds such as γ-butyrolactone, propylene carbonate, ethylene carbonate, butylene carbonate, dimethyl carbonate, diethyl carbonate, ethylmethyl carbonate, methyl formate, 1,2-dimethoxyethane, tetrahydrofuran, dioxolane, dimethylformamide and the like; a solid polyelectrolyte having a solid solution of a lithium salt such as that mentioned above, in a polymer of crosslinked polyethylene oxide, polyphosphazene or the like; or an inorganic solid electrolyte such as $Li_3N$, $LiI$, etc.

The invention is described in more detail with reference to the following Examples, which, however, are not intended to restrict the scope of the invention.

$Li_aCu_bTi_cO_4$ was prepared as follows: Anatase-type titanium dioxide was mixed with lithium hydroxide and copper (II) oxide, and baked at 500° C. for 6 hours. The baked product was ground and stirred, and then further baked in an oxygen atmosphere at 850° C. for 6 hours. The substance thus prepared by mixing and baking the starting compounds in an atomic ratio of lithium/copper/titanium of 2/1/3 was identified as $Li_2CuTi_3O_8$ from its crystal morphology-indicating peaks in X-ray diffractiometry.

EXAMPLE 1

Figure 3:
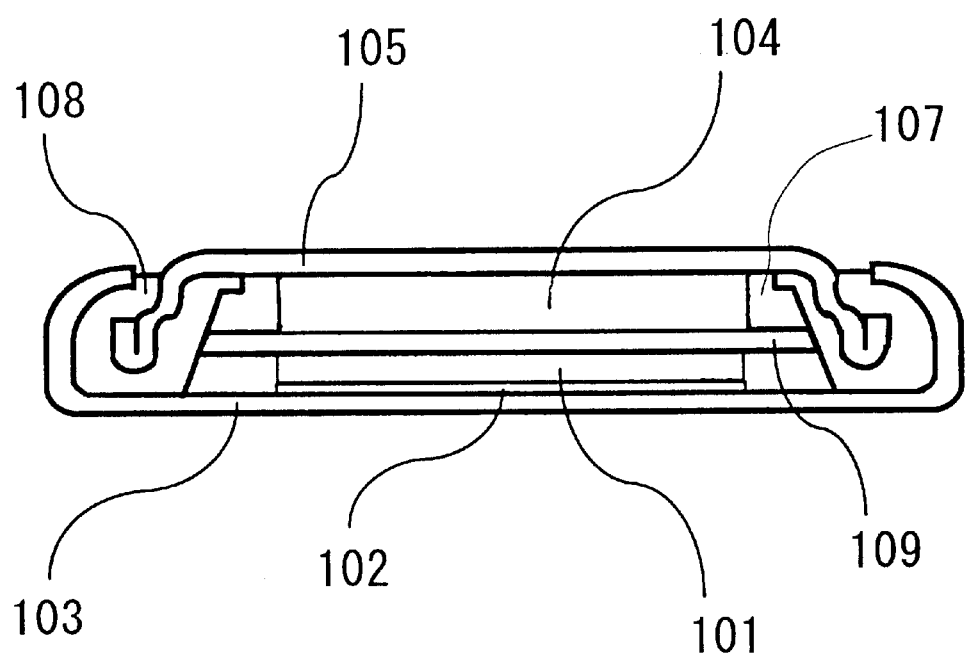
FIG. 3 is a sectional view showing one embodiment of the non-aqueous electrolyte secondary battery according to the present invention.

The cross section of the battery is shown in FIG. 3. This is to demonstrate a lithium secondary battery which is one embodiment of the non-aqueous electrolyte secondary battery of the invention. The ground powder of the active material prepared in the above was mixed with graphite serving as an electroconductive agent, and a polyacrylic resin serving as a binder, in a ratio by weight of 58/40/2 to form an electrode compound. Next, the electrode compound was shaped into pellets having a diameter of 4 mm and a thickness of 0.5 mm, under a pressure of 2 tons/cm². These are positive electrode pellets 101. On the other hand, lithiummetal pellets having a diameter of 5.7 mm and a thickness of 1 mm were prepared. These are negative electrode pellets 104. The positive electrode pellet 101 was bonded to a positive electrode case 103 by means of the electrode current collector 102 which is an electroconductive resin adhesive. Thus the positive electrode unit was obtained. The lithium metal pellet (the negative electrode pellet 104) was to a negative electrode case 105 under pressure. Thus the negative electrode unit was obtained. A porous polyethylene film separator 109 was placed on the positive electrode unit, and an electrolyte 107 was injected into the positive electrode. The positive electrode unit and the negative electrode unit (place on top of the other) were combined via the separator 109 therebetween. That is, the positive electrode case 103 and the negative electrode case 105 were sealed though a gasket 108 by crimping. The electrolyte was encased in the battery cases. The electrolyte 107 used herein was prepared by dissolving $LiClO_4$ in a mixed solvent of propylene carbonate/ethylene carbonate/ethylmethyl carbonate of 1/1/2 by volume, in which the electrolyte concentration was 1 mol/liter.

The lithium secondary battery was subjected to a charge-discharge cycle test, in which the current applied to the battery was 50 μA and was constant and the voltage varied from 3.0 V to 1.0 V. The charge-discharge voltage curve of the battery tested is shown in FIG. 1. As in FIG. 1, the battery had a constant voltage profile of about 1.7 V. The initial charge-discharge capacity of the battery was 140 mAh/g.

A comparative lithium secondary battery was fabricated in the same manner as above, in which, however, $LiTi_2O_4$ was used for the positive electrode active material. This was subjected to the same charge-discharge cycle test as above, and its charge-discharge curve is shown in FIG. 1. The comparative battery had a constant voltage profile of about 1.5 V.

From the data illustrated, it is understood that the charge-discharge voltage of the battery of the invention is shifted by about 0.2 V from that of the comparative battery.

EXAMPLE 2

Figure 4:
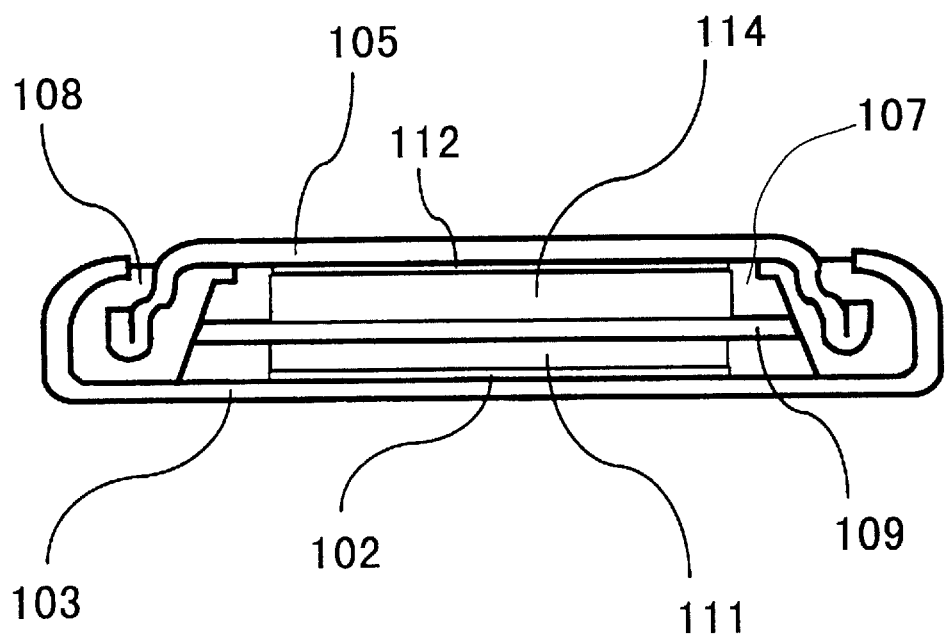
FIG. 4 is a sectional view showing another embodiment of the non-aqueous electrolyte secondary battery according to the present invention.

The cross section of the battery is shown in FIG. 4. This is to demonstrate a lithium ion secondary battery which is another embodiment of the non-aqueous electrolyte secondary battery of the invention. The same active material as in Example 1 was mixed with graphite serving as an electroconductive agent, and a polyacrylic resin serving as a binder, in a ratio by weight of 90/8/2 to form an electrode compound. Next, the electrode compound was shaped into pellets having a diameter of 4 mm and a thickness of 1 mm, under a pressure of 2 tons/cm². These are negative electrode pellets 114. The negative electrode pellet 114 was bonded to a negative electrode case 105 by means of the electrode current collector 112 which is an electroconductive resin adhesive. Thus the negative electrode unit was obtained. On the other hand, in the same manner as in the above for forming the negative electrode pellets 114, an active material of $LiCoO_2$ was formed into an electrode compound and the compound was shaped into pellets having a diameter of 4 mm and a thickness of 0.6 mm. These are positive electrode pellets 111. The positive electrode pellet 111 was bonded to a positive electrode case 103 by means of the electrode current collector 102 which is an electroconductive resin adhesive. Thus the positive electrode unit was obtained. A porous polyethylene film separator 109 was placed on the positive electrode unit, and an electrolyte 107 was injected into the positive electrode. The positive electrode unit and the negative electrode unit (place on top of the other) were combined via the separator 109 therebetween. That is, the positive electrode case 103 and the negative electrode case 105 were sealed though a gasket 108 by crimping. The electrolyte was encased in the battery cases. The electrolyte 107 used herein was prepared by dissolving $LiClO_4$ in a mixed solvent of propylene carbonate/ethylene carbonate/ethylmethyl carbonate of 1/1/2 by volume, in which the electrolyte concentration was 1 mol/liter.

Figure 2:
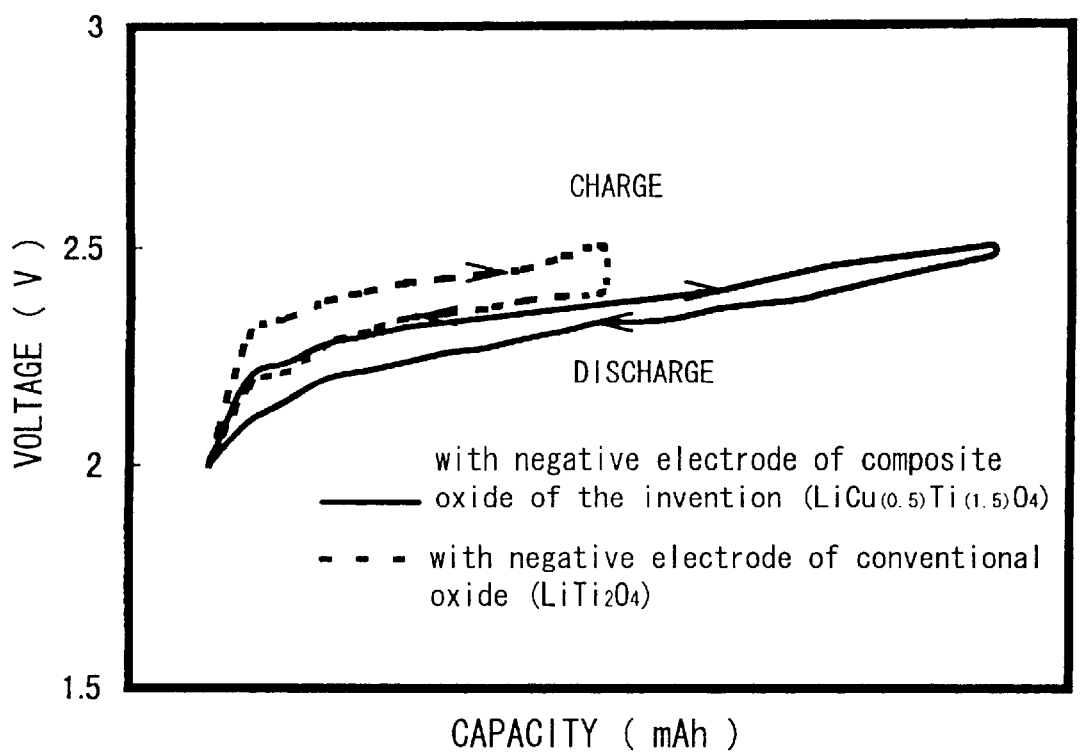
FIG. 2 is a charge-discharge voltage curve of a lithium ion secondary battery, in which the negative electrode is made of the composite oxide of the invention or a conventional oxide, $LiTi_2O_4$, and the positive electrode is made of $LiCoO_2$.

The lithium ion secondary battery was subjected to a charge-discharge cycle test, in which the current applied to the battery was 50 μA and was constant and the voltage varied from 2.5 V to 2.0 V. The charge-discharge curve of the battery tested is shown in FIG. 2. A comparative lithium ion secondary battery was fabricated in the same manner as above, in which, however, $LiTi_2O_4$ was used for the negative electrode active material. This was subjected to the same charge-discharge cycle test as above, and its charge-discharge curve is shown in FIG. 2. From the data illustrated, it is understood that the charge-discharge voltage of the battery of the invention is lower by about 0.2 V or so, than that of the comparative battery with conventional $LiTi_2O_4$. The two batteries were compared with respect to the ratio of their capacity for 2.5 V charge (2.5 V to 2.0 V) to that for 3 V charge (3.0 V to 2.0 V). It was found that the battery of the invention could ensure a capacity of 80% or more, but the capacity of the comparative battery with conventional $LiTi_2O_4$ could not be up to 50%.

As described in detail-hereinabove, a composite oxide of a compositional formula, $Li_aCu_bTi_cO_4$ (in which $0<a\leq1$, $0<b\leq0.5$, $1.5\leq c<2$) is used for the active material for the positive or negative electrode in the non-aqueous electrolyte secondary battery of the invention. Accordingly, the battery of the invention ensures charge-discharge voltage characteristics which differ from those of ordinary batteries having conventional electrode active materials. Specifically, the battery of the invention ensures high capacity even at low charge voltage of 2.5 V or so, at which, however, conventional batteries could not have good battery capabilities.

While the invention has been described in detail and with reference to specific embodiments thereof, it will be apparent to one skilled in the art that various changes and modifications can be made therein without departing from the spirit and scope thereof.

What is claimed is:

1. A non-aqueous electrolyte secondary battery at least comprising:
   a negative electrode;
   a lithium ion-conductive non-aqueous electrolyte; and
   a positive electrode, wherein at least either of the negative electrode or the positive electrode is made of a composite oxide of a compositional formula, $Li_aCu_bTi_cO_4$ with $0<a\leq1$, $0<b\leq0.5$, $1.5\leq c<2$ which is used for the positive or negative electrode active material.

2. A non-aqueous electrolyte secondary battery comprising:
   a positive electrode having a positive electrode active material selected from the group consisting of $LiCoO_2$, $LiNiO_2$ or $LiMn_2O_4$; and
   a negative electrode having a negative electrode active material shown in a compositional formula, $Li_aCu_bTi_cO_4$ with $0<a\leq1$, $0<b\leq0.5$, $1.5\leq c<2$.

* * * * *